United States Patent
Itamochi

(10) Patent No.: US 10,706,296 B2
(45) Date of Patent: Jul. 7, 2020

(54) VEHICLE SAFETY DETERMINATION APPARATUS, METHOD, AND COMPUTER-READABLE STORAGE MEDIUM

(71) Applicant: DENSO CORPORATION, Kariya, Aichi-pref. (JP)

(72) Inventor: Takayuki Itamochi, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 133 days.

(21) Appl. No.: 16/048,599

(22) Filed: Jul. 30, 2018

(65) Prior Publication Data
US 2019/0042862 A1 Feb. 7, 2019

(30) Foreign Application Priority Data
Aug. 1, 2017 (JP) ................. 2017-149294

(51) Int. Cl.
*G06K 9/00* (2006.01)
*G06T 7/50* (2017.01)
*B60Q 9/00* (2006.01)
*G06T 7/73* (2017.01)

(52) U.S. Cl.
CPC ......... *G06K 9/00805* (2013.01); *B60Q 9/008* (2013.01); *G06T 7/50* (2017.01); *G06T 7/73* (2017.01); *G06K 2209/21* (2013.01); *G06T 2207/20084* (2013.01); *G06T 2207/30261* (2013.01)

(58) Field of Classification Search
CPC .. G06K 9/00805; G06K 2209/21; G06T 7/73; G06T 7/50; G06T 2207/20084; G06T 2207/30261; B60Q 9/008
See application file for complete search history.

(56) References Cited

U.S. PATENT DOCUMENTS 9,248,834 B1 * 2/2016 Ferguson .............. B60W 30/09
2007/0268146 A1 11/2007 Itou

FOREIGN PATENT DOCUMENTS

| JP | 2004-046875 | 2/2004 |
| JP | 2007-310729 | 11/2007 |
| JP | 2016-192104 | 11/2016 |

* cited by examiner

*Primary Examiner* — Siamak Harandi
(74) *Attorney, Agent, or Firm* — Maschoff Brennan

(57) ABSTRACT

In a vehicle safety determination apparatus, an image of an area observed from a vehicle is acquired. Based on the image, a type, position, and shape of each recognition target in an image are recognized and recorded. A target is detected among recognition targets. A predicted path of the target is calculated based on recognition results of the image recognition for the recorded target. A most proximal time at which the vehicle and the target are in closest proximity is calculated based on the traveling state of the vehicle and the distance from the vehicle and the movement state of the target. A predicted position of the target at the most proximal time is calculated based on the predicted path. The safety determination regarding the target is performed based on the predicted position and on the type, position, and shape of at least one recognition target other than the target.

7 Claims, 5 Drawing Sheets

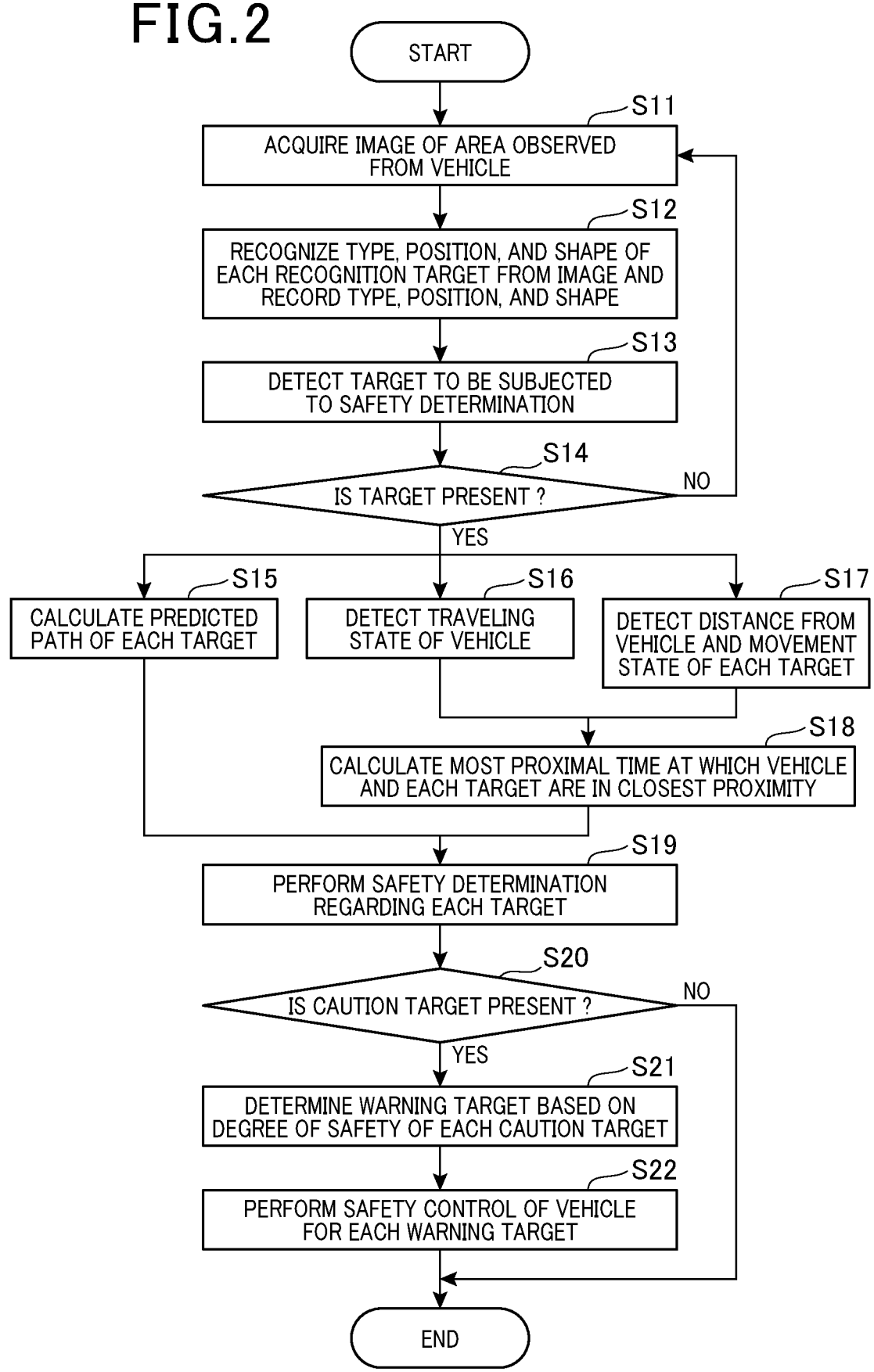

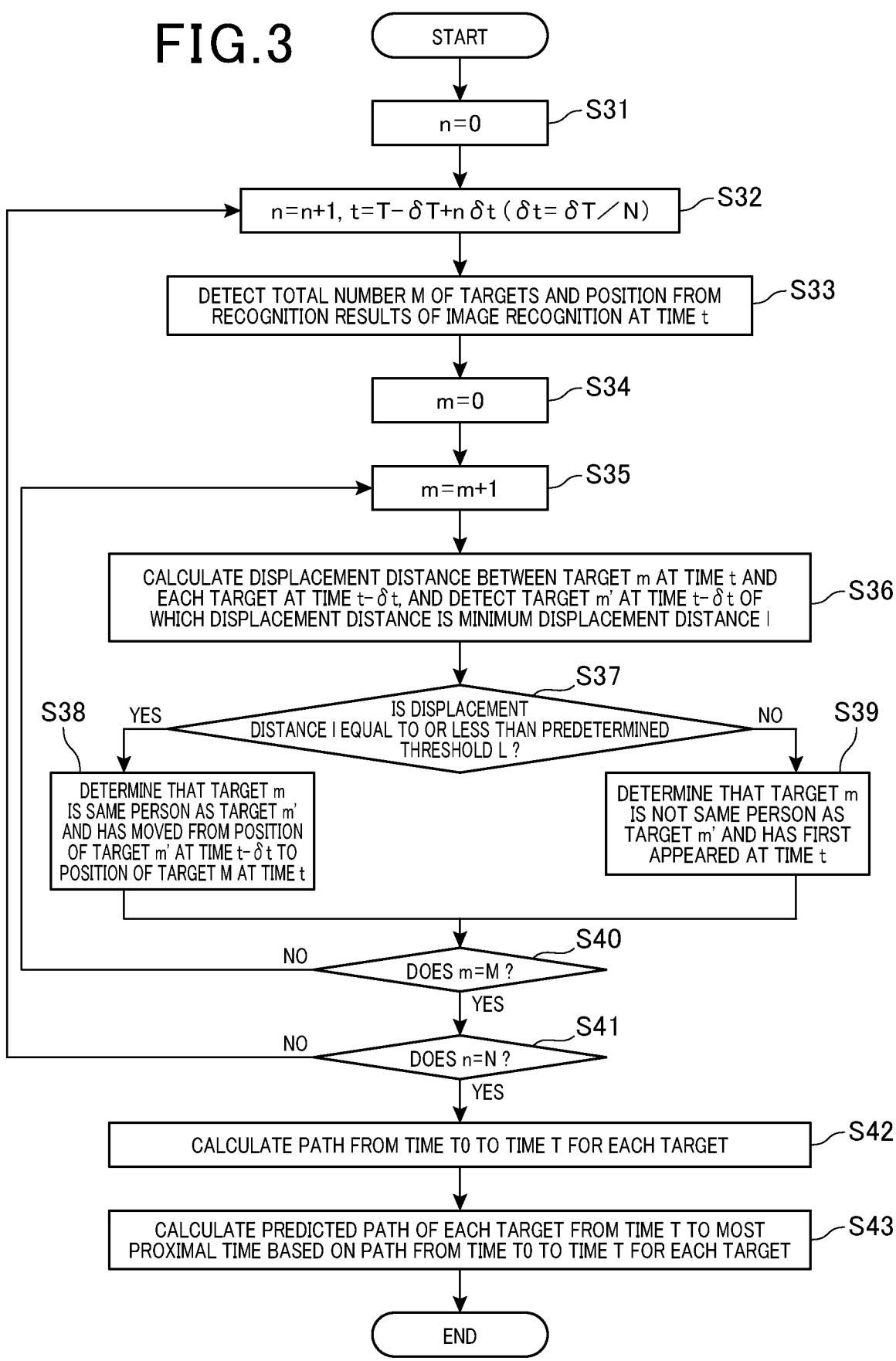

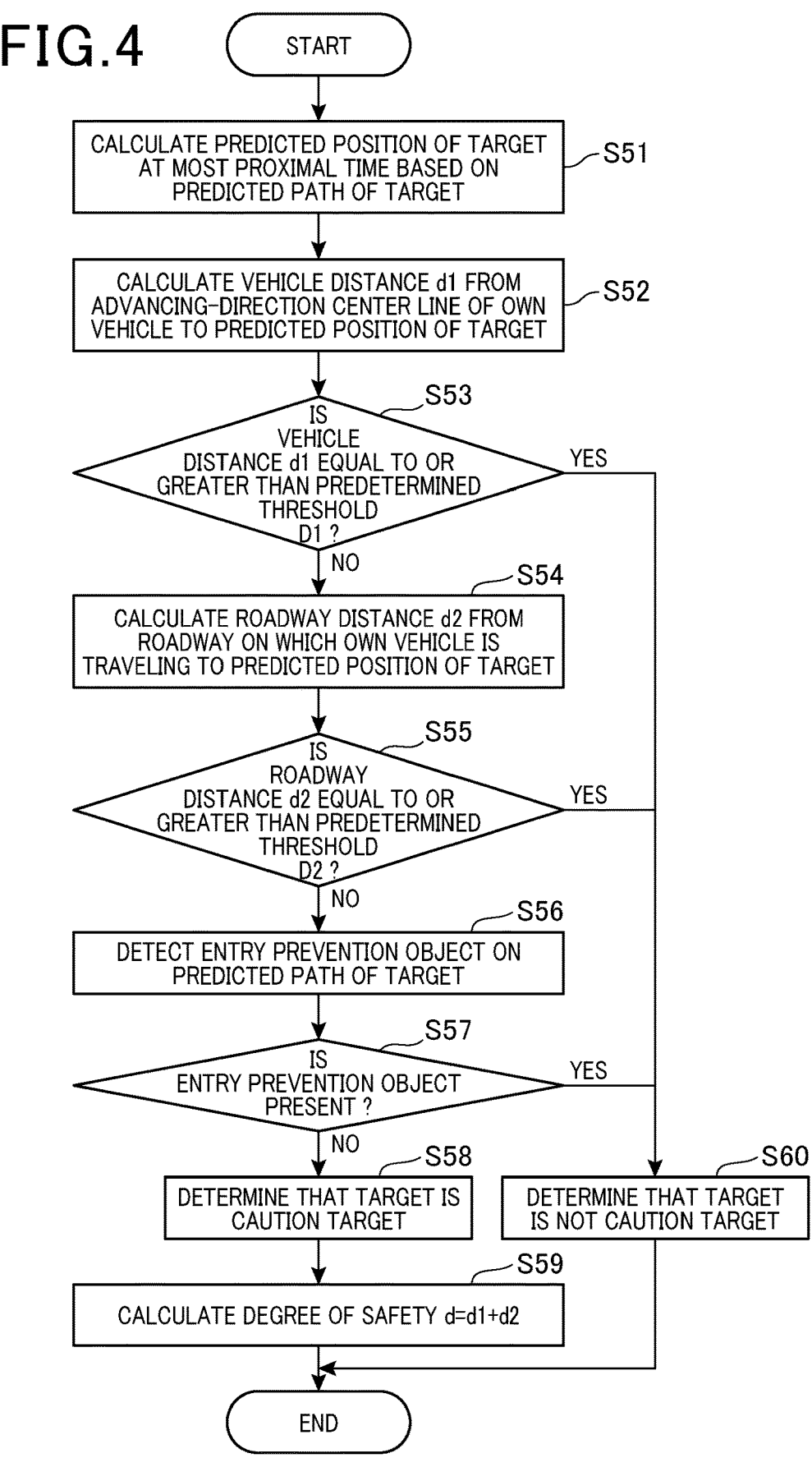

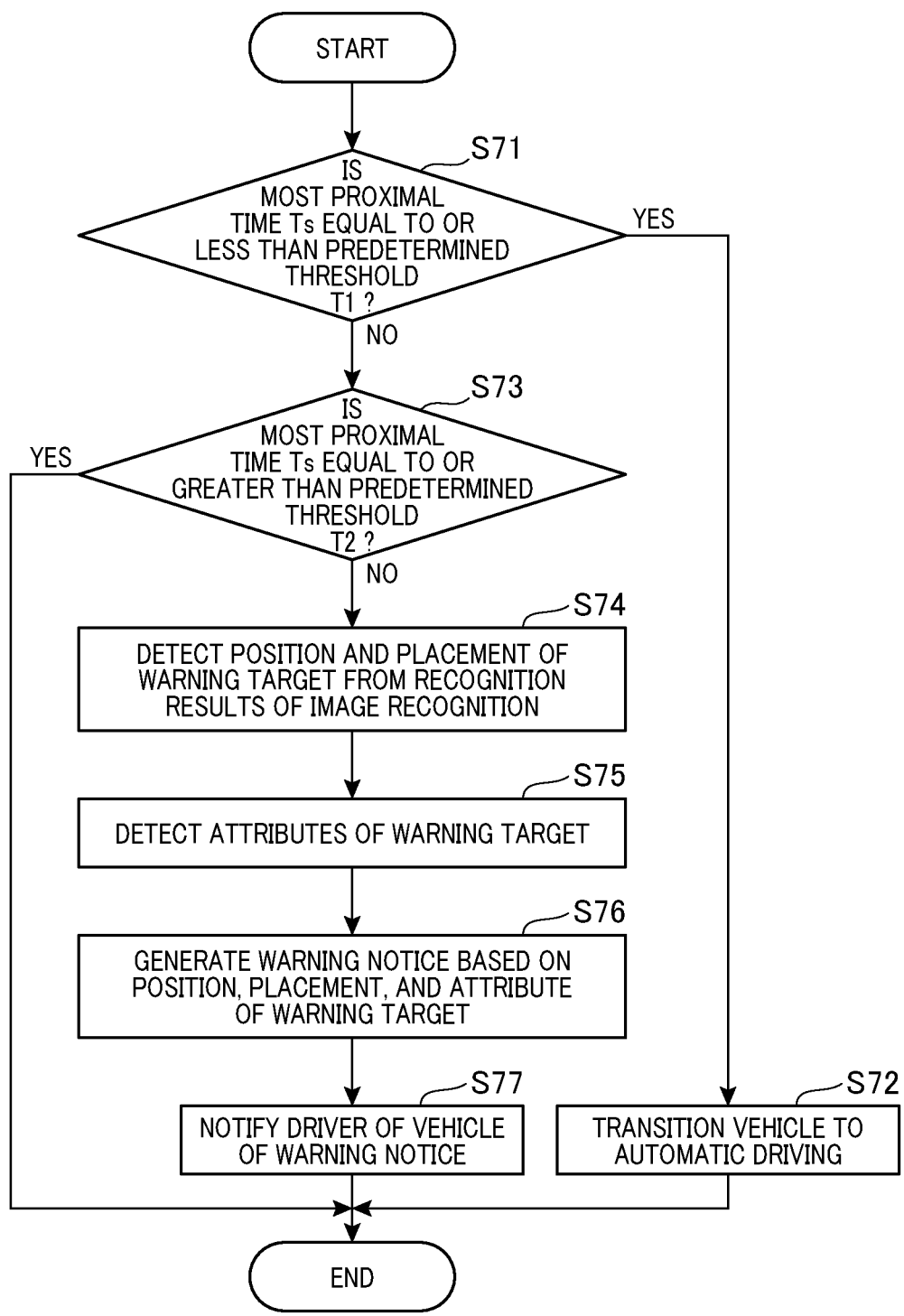

VEHICLE SAFETY DETERMINATION APPARATUS, METHOD, AND COMPUTER-READABLE STORAGE MEDIUM

CROSS-REFERENCE TO RELATED APPLICATION

This application is based on and claims the benefit of priority from earlier Japanese Patent Application No. 2017-149294, filed Aug. 1, 2017, the description of which is incorporated herein by reference.

BACKGROUND

Technical Field

The present disclosure relates to a vehicle safety determination apparatus that determines the safety of a target, and a method and a computer-readable storage medium storing a program thereon.

Related Art

Conventionally, various types of safe driving apparatuses have been proposed to implement safe driving of a vehicle (refer to, for example, JP-A-2016-192104). In such safe driving apparatuses, the safety of a pedestrian or the like is determined based on recognition results of an image that has been acquired by an on-board camera. Vehicle control and notification to a driver are performed based on the determination result of the safety determination.

However, in the image recognition performed in conventional safe driving apparatuses, only a type and an overall position of a recognition target are individually recognized for each recognition target of which the entirety thereof is included in the image. Accurate safety determination is difficult to perform.

SUMMARY

It is thus desired to provide a vehicle safety determination apparatus that is capable of performing an accurate safety determination, and a method and a non-transitory computer-readable storage medium storing a program thereon.

A first exemplary embodiment of the present disclosure provides a vehicle safety determination apparatus that includes: an image acquiring unit that acquires an image of an area observed from a vehicle; an image recognition recording unit that recognizes a type, position, and shape of each recognition target in an image, based on the image acquired by the image acquiring unit, records the type, position, and shape of each recognition target, and detects a target to be subjected to safety determination among the recognition targets; a predicted path calculator that calculates a predicted path of the target based on the recognition results of the image recognition for the target recorded in the image recognition recording unit; a traveling state detector that detects a traveling state of the vehicle; a distance and movement state detector that detects a distance from the vehicle and a movement state of the target; a most proximal time calculator that calculates a most proximal time (time of closest approach) at which the vehicle and the target are in closest proximity, based on the traveling state of the vehicle, and the distance from the vehicle and the movement state of the target; and a safety determiner that calculates a predicted position of the target at the most proximal time based on the predicted path, and performs the safety determination regarding the target based on the predicted position and on the type, position, and shape of at least one recognition target other than the target recognized by the image recognition recording unit.

A second exemplary embodiment of the present disclosure provides a vehicle safety determination method including: acquiring, using a processor of a vehicle safety determination apparatus mounted to a vehicle, an image of an area observed from a vehicle; recognizing, using the processor, a type, position, and shape of each recognition target in an image, based on the image acquired at the image acquisition step, recording the type, position, and shape of each recognition target, and detecting a target to be subjected to safety determination among the recognition targets; calculating, using the processor, a predicted path of the target based on the recognition results of the image recognition for the recorded target; detecting, using the processor, a traveling state of the vehicle; detecting, using the processor, a distance from the vehicle and a movement state of the target; calculating, using the processor, a most proximal time at which the vehicle and the target are in closest proximity, based on the traveling state of the vehicle, and the distance from the vehicle and the movement state of the target; calculating, using the processor, a predicted position of the target at the most proximal time based on the predicted path; and performing, using the processor, the safety determination regarding the target based on the predicted position and on the type, position, and shape of at least one recognition target other than the target.

A third exemplary embodiment of the present disclosure provides a non-transitory computer-readable storage medium storing a vehicle safety determination program for enabling a computer executing the vehicle safety determination program to: acquire an image of an area observed from a vehicle; recognize a type, position, and shape of each recognition target in an image, based on the image acquired by the image acquisition function, record the type, position, and shape of each recognition target, and detect a target to be subjected to safety determination among the recognition targets; calculate a predicted path of the target based on the recognition results of the image recognition for the target recorded by the image recognition recording function; detect a traveling state of the vehicle; detect a distance from the vehicle and a movement state of the target; calculate a most proximal time at which the vehicle and the target are in closest proximity, based on the traveling state of the vehicle, and the distance from the vehicle and the movement state of the target; calculate a predicted position of the target at the most proximal time based on the predicted path; and perform the safety determination regarding the target based on the predicted position and on the type, position, and shape of at least one recognition target other than the target.

As a result of the present disclosure, an accurate safety determination can be performed.

BRIEF DESCRIPTION OF THE DRAWINGS

In the accompanying drawings:

FIG. 2 is a flowchart of a safe driving method according to the embodiment of the present disclosure;

FIG. 3 is a flowchart of a predicted path calculation step according to the embodiment of the present disclosure;

FIG. 4 is a flowchart of a safety determination step according to the embodiment of the present disclosure; and FIG. 5 is a flowchart of a safety control step according to the embodiment of the present disclosure.

DESCRIPTION OF THE EMBODIMENTS

Figure 1:
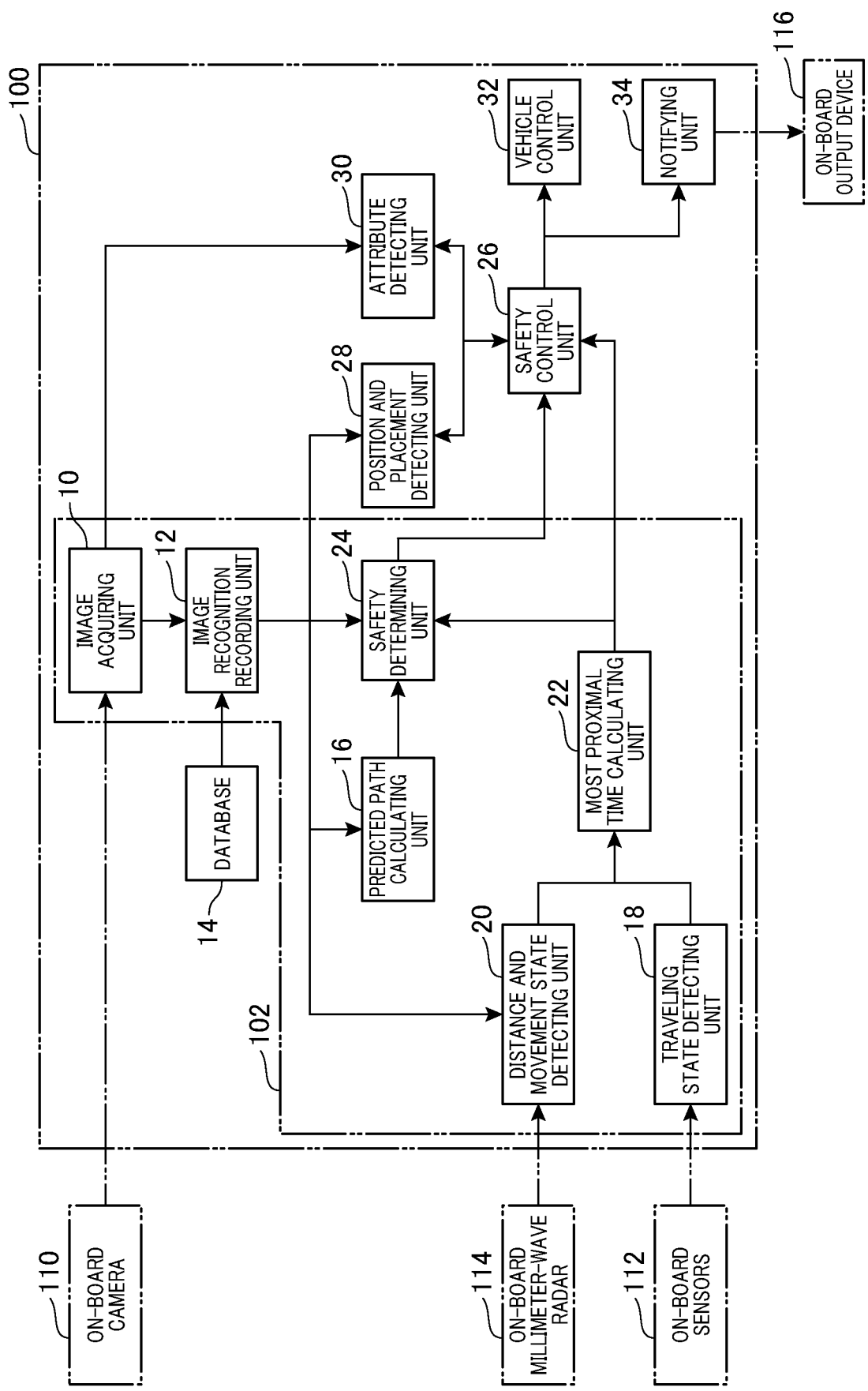
FIG. 1 is a block diagram of a safe driving apparatus according to an embodiment of the present disclosure.

An embodiment of the present disclosure will be described with reference to FIG. 1 to FIG. 5.

For example, the following steps are performed in a vehicle safe driving apparatus and a method thereof according to the present embodiment.

That is, an on-board monocular camera acquires an image of an area observed from a vehicle. Positions and shapes of pedestrians, roadways, sidewalks, guardrails, and the like in the image are recognized through use of an image recognition technique such as semantic segmentation. A previously walked path of a pedestrian is calculated based on the recognition results of the image recognition. From a future predicted walking path that is calculated from the previously walked path, a predicted position of the pedestrian at a most proximal time (time of closest approach) is calculated. The most proximal time is the time at which the vehicle and the pedestrian are in closest proximity. Based on a distribution range of the roadway recognized by the image recognition, a distance from the vehicle to the pedestrian at the predicted position is calculated.

Safety determination regarding the pedestrian is performed based on the calculated distance. In addition, based on the distribution range of the guardrails or the like recognized by the image recognition, whether or not an object such as a guardrail that prevents the pedestrian from entering the roadway is present on the predicted walking path of the pedestrian is determined. The safety determination regarding the pedestrian is performed based on whether or not this object is present.

Then, based on a ground position of the pedestrian recognized by the image recognition, placement of the pedestrian, that is, a location of the pedestrian on the roadway or the sidewalk is detected. A driver of the vehicle is notified of the determination result of the safety determination regarding the pedestrian and the placement of the pedestrian.

An overall configuration of a vehicle safe driving apparatus 100 using a vehicle safety determination apparatus 102 according to the present embodiment will be described with reference to FIG. 1.

As shown in FIG. 1, the vehicle safe driving apparatus 100 includes an image acquiring unit 10, an image recognition recording unit 12, a database 14, a predicted path calculating unit 16, a traveling state detecting unit 18, a distance and movement state detecting unit 20, a most proximal time calculating unit 22, a safety determining unit 24, a safety control unit 26, a position and placement detecting unit 28, an attribute detecting unit 30, a vehicle control unit 32, and a notifying unit 34.

These units may be configured by: (i) hardware, such as a microcomputer that includes a central processing unit (CPU) (e.g., a processor), a memory (e.g., a read-only memory (ROM) and a random-access memory (RAM)), and an input/output (I/O) device; and (ii) software (i.e., a program) that runs on the hardware. For example, the following functions of these units are implemented by the processor running the program stored in the memory.

Of these units, at least the image acquiring unit 10, the image recognition recording unit 12, the predicted path calculating unit 16, the traveling state detecting unit 18, the distance and movement state detecting unit 20, the most proximal time calculating unit 22, and the safety determining unit 24 configure the vehicle safety determination apparatus 102 that is provided in the safe driving apparatus 100. The safe driving apparatus 100 and the vehicle safety determination apparatus 102 may be configured separately from each other or configured integrally with each other.

In the safe driving apparatus 100, the image acquiring unit 10 provides a function for acquiring an image of an area observed from the vehicle. In the present embodiment, the image acquiring unit 10 uses an onboard camera (image sensor) 110 such as an onboard monocular camera to acquire an image of an area ahead of the vehicle. The image acquiring unit 10 and the onboard camera 110 may be configured separately from each other or configured integrally with each other.

The image recognition recording unit 12 provides a function for recognizing the type, position, and shape of each recognition target in the image based on the image acquired by the image acquiring unit 10, using learning data for image recognition collected in the database 14, and records the recognized type, position, and shape. In addition, the image recognition recording unit 12 also provides a function for detecting a target that is to be subjected to the safety determination among the recognition targets.

The predicted path calculating unit (predicted path calculator) 16 provides a function for calculating a previous path for each target based on the recognition results of the image recognition for each target recorded in the image recognition recording unit 12. The predicted path calculating unit 16 then calculates a future predicted path from the calculated previous path.

The traveling state detecting unit (traveling state detector) 18 provides a function for detecting a traveling state of the vehicle. In the present embodiment, the traveling state detecting unit 18 uses various types of on-board sensors 112 (e.g., a speed sensor, an acceleration sensor, and a steering angle sensor) to detect speed, acceleration, and advancing direction of the vehicle. The traveling state detecting unit 18 and the onboard sensors 112 may be configured separately from each other or configured integrally with each other.

The distance and movement state detecting unit (distance and movement state detector) 20 provides a function for detecting a distance from the vehicle and a movement state of each target. In the present embodiment, the distance and movement state detecting unit 20 uses an on-board millimeter-wave radar 114 to detect the distance to the pedestrian from the vehicle, and a walking speed and a walking direction of the pedestrian. The distance and movement state detecting unit 20 and the on-board millimeter-wave radar 114 may be configured separately from each other or configured integrally with each other.

The most proximal time calculating unit (most proximal time calculator) 22 provides a function for calculating the most proximal time (time of closest approach) based on the traveling state detected by the traveling state detecting unit 18 and the distance from the vehicle and the movement state of each target detected by the distance and movement state detecting unit 20. The most proximal time is the time at which the vehicle and the target are in closest proximity.

The safety determining unit (safety determiner) 24 provides a function for detecting a caution target (priority target) based on the predicted path calculated by the predicted path calculating unit 16, the most proximal time calculated by the most proximal time calculating unit 22, and the recognition results of the image recognition by the image recognition recording unit 12. The caution target is a target for which caution regarding safety is required among the targets. The safety determining unit 24 calculates a degree of safety for each caution target.

The safety control unit (safety controller) 26 provides a function for determining a warning target based on the degree of safety of each caution target calculated by the safety determining unit 24. The warning target is a target for which caution regarding safety is particularly required among the caution targets. In addition, the safety control unit 26 provides a function for controlling the vehicle control unit (vehicle controller) 32 to automatically drive the vehicle based on the most proximal time calculated by the most proximal time calculating unit 22 for each warning target. In the present embodiment, the vehicle control unit 32 performs automatic control of a drive apparatus, a brake apparatus, a steering apparatus, and the like and safely avoids the warning target.

The position and placement detecting unit (location detector) 28 provides a function for detecting a position and a placement of each warning target based on the recognition results of the image recognition by the image recognition recording unit 12.

The attribute detecting unit (attribute detector) 30 provides a function for detecting attributes of each warning target based on the image acquired by the image acquiring unit 10. The safety control unit 26 provides a function for controlling the notifying unit 34 using an on-board output device 116 (e.g., an on-board display and an on-board speaker) to notify the driver of the vehicle of the position, placement, and attributes of each warning target detected by the position and placement detecting unit 28 and the attribute detecting unit 30. The notifying unit 34 and the on-board output device 116 may be configured separately from each other or configured integrally with each other.

A vehicle safe driving method performed by the safe driving apparatus 100 according to the present embodiment will be described with reference to FIG. 2 to FIG. 5.

An overview of the vehicle safe driving method will be described with reference to FIG. 2. The safe driving method includes the following steps S11 to S22. Among the steps S11 to S22 in the safe driving method, the following steps S12, S15, S19, and S22 will be successively described again in further detail.

At step S11 (image acquisition step), the image acquiring unit 10 acquires the image of an area observed from the vehicle. According to the present embodiment, the image acquiring unit 10 uses the on-board camera 110 such as the on-board monocular camera to acquire an image of an area ahead of the vehicle.

At step S12 (image recognition recording step), the image recognition recording unit 12 recognizes the type, position, and shape of each recognition target in the image based on the image acquired at the image acquisition step, using the learning data for image recognition, and records the type, position, and shape. According to the present embodiment, the positions and shapes of pedestrians, roadways, sidewalks, guardrails, and the like are recognized.

At step S13 (target detection step), the image recognition recording unit 12 detects a target to be subjected to the safety determination from the recognition results of the image recognition acquired at step S12. As the target, various targets for which the safety determination is required are selected. According to the present embodiment, a pedestrian is selected as the target.

At step S14 (target presence determination step), the safe driving apparatus 100 determines whether or not the target to be subjected to the safety determination is present. When determined that the target is not present, the safe driving apparatus 100 returns to step S11. Meanwhile, when determined that the target is present, the safe driving apparatus 100 proceeds to the following steps S15 to S22.

At step S15 (predicted path calculation step), the predicted path calculating unit 16 calculates the previous path for each target from the recognition results of the image recognition acquired at step S12. The predicted path calculating unit 16 then calculates the future predicted path from the previous path. According to the present embodiment, the predicted walking path of each pedestrian is calculated.

At step S16 (traveling state detection step), the traveling state detecting unit 18 detects the traveling state of the vehicle. According to the present embodiment, speed, acceleration, and advancing direction of the vehicle are detected by the traveling state detecting unit 18 using the various types of on-board sensors 112 such as a speed sensor, an acceleration sensor, and a steering angle sensor.

At step S17 (distance and movement state detection step), the distance and movement state detecting unit 20 detects the distance from the vehicle and the movement state of each target. According to the present embodiment, the distance to the pedestrian from the vehicle, and a walking speed and a walking direction of the pedestrian are detected by the distance and movement state detecting unit 20 using the on-board millimeter-wave radar 114.

At step S18 (most proximal time calculation step), the most proximal time calculating unit 22 calculates the most proximal time at which the vehicle and each target are at closest proximity based on the traveling state of the vehicle detected at step S16, and the distance from the vehicle and the movement state of each target detected at step S17. According to the present embodiment, the most proximal time of the vehicle and each target is calculated based on the speed, acceleration and advancing direction of the vehicle, the distance to each pedestrian from the vehicle, and the walking speed and walking direction of each pedestrian.

At step S19 (safety determination step), the safety determining unit 24 detects the caution target for which caution regarding safety is required among the targets based on the predicted path calculated at step S15, the most proximal time calculated at step S18, and the recognition results of the image recognition at step S12. The safety determining unit 24 then calculates the degree of safety for each caution target.

At step S20 (caution target presence determination step), the safe driving apparatus 100 determines whether or not the caution target for which caution regarding safety is required is present. When determined that the caution target is not present, the safe driving apparatus 100 ends the safe driving method. Meanwhile, when determined that the caution target is present, the safe driving apparatus 100 proceeds to step S21.

At step S21 (warning target determination step), the safety control unit 26 determines the warning target for which caution regarding safety is particularly required among the caution targets, based on the degree of safety of each caution target calculated at step S19. According to the present embodiment, the caution target that has the lowest degree of safety among the caution targets is determined to be the warning target. In a variation example according to the present embodiment, a caution target that has a degree of safety that is equal to or less than a predetermined threshold may be determined to be the warning target. Alternatively, a number of caution targets that have the lowest degrees of safety may be determined to be the warning targets.

At step S22 (safety control step), the safety control unit 26 performs safety control of the vehicle for each warning target. In the safety control of the vehicle, automatic driving of the vehicle is performed for each warning target, based on the most proximal time calculated at step S18. In addition, in the safety control of the vehicle, the position and the placement of the warning target, as well as the attributes of the warning target, are detected based on the recognition results of the image recognition at step S12. The driver of the vehicle is notified of the position, placement, and attributes of each warning target.

Next, the image recognition recording step S12 will be described in detail, below.

In the image recognition in a conventional safe driving method, the type and the overall position of a recognition target are merely individually recognized for each recognition target of which the entirety thereof is included in the image. However, in the image recognition in the safe driving method according to the present embodiment, the type, position, and shape of each recognition target in the image are recognized.

As such an image recognition technique, for example, semantic segmentation is used. In semantic segmentation, in an image captured by a single-lens camera, each pixel in the image can be classified based on the type of the recognition target, using learning data for image recognition. For example, the positions and shapes of pedestrians, roadways, sidewalks, guardrails, and the like can be simultaneously recognized. Calculation of the walking path of the pedestrian, detection of the roadway on which the vehicle is traveling, detection of distribution ranges of the roadway, sidewalk, and guardrails, and the like, detection of the ground position of the pedestrian and the like can be performed.

As such an image recognition technique, for example, an image recognition technique disclosed in V. Badrinarayanan, and et al., Segnet: A Deep Convolutional Encoder-Decoder Architecture for Image Segmentation, arXiv 2015 can be used.

Next, the predicted path calculation S15 will be described in detail with reference to FIG. 3.

At step S15, the predicted path calculating unit 16 calculates the previous path for each target based on the recognition results of the image recognition and calculates the future predicted path from the previous path, as described above, through the following steps. According to the present embodiment, the predicted walking path of the pedestrian is calculated.

In steps S31 to S41 (time loop steps), T denotes a current time, $\delta T$ denotes a search time, N denotes a division number, and $\delta t (= \delta T/N)$ denotes a division time. Regarding time t, from time $T - \delta T$ to time T, the predicted path calculating unit 16 performs a loop of the following steps S33 to S40, at every division time $\delta t$.

At step S31, the predicted path calculating unit 16 sets n to n=0. At step S32, the predicted path calculating unit 16 increments n by 1 (i.e., n is set to n=n+1) and sets t to $t = T - \delta T + n \delta t$ ($\delta t = \delta T/N$). At step S41, the predicted path calculating unit 16 determines whether or not n=N. If it is determined that n=N (YES at step S41), the predicted path calculating unit 16 proceeds to step S42, and if it is not determined that n=N (NO at step S42), the predicted path calculating unit 16 returns to step S32.

At step S33 (total and position detection step), the predicted path calculating unit 16 detects a total number M of targets in the image and the position of each target based on the recognition results of the image recognition at time t.

At steps S34 to S40 (target loop steps), at time t, for each target from a first target to an M-th target, the predicted path calculating unit 16 performs a loop of the following steps S36 to S39.

At step S34, the predicted path calculating unit 16 sets m to m=0. At step S35, the predicted path calculating unit 16 increments m by 1 (i.e., m is set to m=m+1). At step S40, the predicted path calculating unit 16 determines whether or not m=M. If it is determined that m=M (YES at step S40), the predicted path calculating unit 16 proceeds to step S41, and if it is not determined that m=M (NO at step S40), the predicted path calculating unit 16 returns to step S35.

At step S36 (displacement distance calculation step), the predicted path calculating unit 16 calculates respective displacement distances between the m-th target at time t and each target at time $t - \delta t$. The predicted path calculating unit 16 detects an m'-th target at time $t - \delta t$ of which the displacement distance is a minimum displacement distance 1.

At step S37 (displacement distance determination step), the predicted path calculating unit 16 determines whether or not the displacement distance 1 is equal to or less than a predetermined threshold L. The threshold L is set as appropriate to a distance over which the target can ordinarily move during time $\delta t$. According to the present embodiment, the threshold L is set as appropriate to a distance over which a pedestrian can ordinarily move during time $\delta t$.

When the displacement distance 1 is equal to or less than the predetermined threshold L, the displacement distance 1 is a distance over which the target can ordinarily move during time $\delta t$. Therefore, the predicted path calculating unit 16 proceeds to step S38.

Meanwhile, when the displacement distance 1 is not equal to or less than the predetermined threshold L, the displacement distance 1 is not a distance over which the target can ordinarily move during time $\delta t$. Therefore, the predicted path calculating unit 16 proceeds to step S39.

When the displacement distance 1 is equal to or less than the predetermined threshold L, the displacement distance 1 is a distance over which the target can ordinarily move during time $\delta t$. Therefore, at step S38 (identity determination step), the predicted path calculating unit 16 determines that the m-th target at time t is the same person as the m'-th target at time $tT \delta t$, and has moved from the position of the m'-th target at time $t - \delta t$ to the position of the m-th target at time t.

Meanwhile, when the displacement distance 1 is not equal to or less than the predetermined threshold L, the displacement distance 1 is not a distance over which the target can ordinarily move during time $\delta t$. Therefore, at step S39 (non-identity determination step), the predicted path calculating unit 16 determines that the m-th target at time t is not the same person as the m'-th target at time $t - \delta t$ and has appeared for the first time at time t.

At step S42 (path detection step), the predicted path calculating unit 16 calculates a path from time T0 to the current time T for each target at the current time T, based on the position at every division time $\delta t$ from time T0 when the target first appeared to the current time T.

At step S43 (predicted path calculation step), the predicted path calculating unit 16 calculates the predicted path from the current time T until the elapse of the most proximal time for each target at the current time T, based on the path from time T0 to the current time T. According to the present embodiment, the predicted walking path from the current time T until the elapse of the most proximal time is calculated by a linear form of the walked path from time T0 to the current time T being extended for each pedestrian.

Next, the safety determination step S19 will be described in detail with reference to FIG. 4.

At step S19, the safety determining unit 24 detects the caution target for which caution regarding safety is required among the targets and calculates the degree of safety for each caution target, based on the predicted path, the most proximal time, and the recognition results of the image recognition, as described above, through the following steps S51 to S60.

At step S51 (predicted position calculation step), the safety determining unit 24 calculates a predicted position of the target at the most proximal time based on the predicted path of the target.

At step S52 (vehicle distance calculation step), the safety determining unit 24 calculates a vehicle distance d1 from an advancing-direction center line of the own vehicle to the predicted position of the target.

At step S53 (vehicle distance determination step), the safety determining unit 24 determines whether or not the vehicle distance d1 of the target is equal to or greater than a predetermined threshold D1. The threshold D1 is appropriately set to a threshold enabling the safety determining unit 24 to determine that the target is sufficiently safe in terms of the positional relationship between the target and the vehicle, if the target is separated from the advancing-direction center line of the vehicle by the distance D1 or greater.

When determined that the vehicle distance d1 of the target is equal to or greater than the predetermined threshold D1, the safety determining unit 24 can determine that the target is sufficiently safe based on the positional relationship between the target and the vehicle. Therefore, the safety determining unit 24 proceeds to step S60.

Meanwhile, when determined that the vehicle distance d1 of the target is not equal to or greater than the predetermined threshold D1, the safety determining unit 24 determines that caution is required regarding the safety of the target in terms of the positional relationship between the target and the vehicle. The safety determining unit 24 proceeds to step S54.

At step S54 (the roadway distance calculation step), the safety determining unit 24 calculates a roadway distance d2 from the roadway on which the own vehicle is traveling to the predicted position of the target. When the predicted position of the target is on the roadway, the roadway distance d2 is set to zero. As described above, in the image recognition in the safe driving method according to the present embodiment, the distribution range of the roadway can be recognized. Therefore, the distance from the roadway to the pedestrian can be calculated upon detection of the roadway on which the vehicle is traveling.

At step S55 (roadway distance determination step), the safety determining unit 24 determines whether or not the roadway distance d2 of the target is equal to or greater than a predetermined threshold D2. The threshold D2 is set as appropriate to a threshold allowing determination that the target is sufficiently safe in terms of the positional relationship between the target and the roadway, if the target is separated from the roadway by the distance D2 or greater, even when the vehicle distance d1 from the advancing-direction center line of the vehicle is less than the threshold D1.

When determined that the roadway distance d2 of the target is equal to or greater than the predetermined threshold D2, the safety determining unit 24 can determine that the target is sufficiently safe based on the positional relationship between the target and the roadway. Therefore, the safety determining unit 24 proceeds to step S60.

Meanwhile, when determined that the roadway distance d2 of the target is not equal to or greater than the predetermined threshold D2, the safety determining unit 24 determines that caution is required regarding the safety of the target in terms of the positional relationship between the target, and the vehicle and the roadway. The safety determining unit 24 proceeds to step S56.

At step S56 (entry prevention target detection step), the safety determining unit 24 detects whether or not an entry prevention object is present. The entry prevention object is an object that prevents the target from entering the roadway. As the entry prevention object, in addition to guardrails, ascending stairs to a pedestrian bridge, descending stairs to an underground passage, and a parked or stopped vehicle such as a private vehicle or a bus which the pedestrian is expected to board are supposed.

In the image recognition in the safe driving method according to the present embodiment, the distribution range of the guardrails and the like can be recognized. In addition, the predicted walking path of the pedestrian can be calculated from the recognition results of the image recognition. Therefore, whether or not the guardrails or the like are present on the predicted walking path of the pedestrian can be detected.

At step S57 (entry prevention object presence determination step), the safety determining unit 24 determines whether or not the entry prevention object is present on the predicted path of the target. When determined that the entry prevention object is present on the predicted path of the target, the safety determining unit 24 can determine that the target is unlikely to enter the roadway and is sufficiently safe. Therefore, the safety determining unit 24 proceeds to step S60.

Meanwhile, when determined that the entry prevention object is not present on the predicted path of the target, the safety determining unit 24 determines that the target may enter the roadway, and caution is required regarding the safety of the target. The safety determining unit 24 proceeds to step S58.

At step S58 (applicability determination step), when determined that the vehicle distance d1 of the target is not equal to or greater than the predetermined threshold D1, the roadway distance d2 is not equal to or greater than the predetermined threshold D2, and the entry prevention object is not present on the predicted path of the target, the safety determining unit 24 determines the target as being the caution target for which caution regarding safety is required.

At step S59 (degree-of-safety calculation step), the safety determining unit 24 calculates the degree of safety by adding the vehicle distance d1 and the roadway distance d2 for each caution target. The target is farther away from the advancing-direction center line of the vehicle and the roadway as the vehicle distance d1 and the roadway distance d2 increase. Therefore, the target can be considered to be safer. Therefore, the degree of safety increases.

At step S60 (non-applicability determination step), when determined that the vehicle distance d1 of the target is equal to or greater than the predetermined threshold D1, the roadway distance d2 is equal to or greater than the predetermined threshold D2, or the entry prevention object is present on the predicted path of the target, the safety determining unit 24 determines that the target is not a caution target for which caution regarding safety is required.

Next, the safety control step S22 will be described in detail with reference to FIG. 5.

At step S22, the safety control unit 26 performs safety control of the vehicle for each warning target for which caution regarding safety is particularly required among the caution targets, as described above, through the following steps S71 to S77.

At step S71 (automatic driving necessity determination step), the safety control unit 26 determines whether or not the most proximal time Ts is equal to or less than a predetermined threshold T1. The threshold T1 is set to a shortest amount of time over which the warning target can be sufficiently and safely avoided by a driving operation by the driver themselves.

When determined that the most proximal time Ts is equal to or less than the predetermined threshold T1, the safety control unit 26 determines that the target cannot be sufficiently and safely avoided by the driving operation by the driver themselves. Therefore, the safety control unit 26 proceeds to step S72.

Meanwhile, when determined that the most proximal time Ts is not equal to or less than the predetermined threshold T1, the safety control unit 26 determines that the warning target can be sufficiently and safely avoided by the driving operation by the driver themselves. The safety control unit 26 proceeds to step S73.

At step S72 (automatic driving step), when the most proximal time Ts is determined to be equal to or less than the predetermined threshold T1 at the automatic driving requirement determination step, the safety control unit 26 transitions the vehicle to automatic driving. The safety control unit 26 performs automatic control of a drive apparatus, a brake apparatus, a steering apparatus, and the like and safely avoids the warning target.

At step S73 (notification necessity determination step), the safety control unit 26 determines whether or not the most proximal time Ts is equal to or greater than a predetermined threshold T2. The threshold T2 is set as appropriate to a shortest amount of time for which notification to the driver of the presence of the warning target can be considered unnecessary at the current point in time, because there is sufficient time before the vehicle becomes most proximal to the warning target.

When determined that the most proximal time Ts is equal to or greater than the predetermined threshold Ts, the safety control unit 26 determines that there is sufficient time until the vehicle becomes most proximal to the warning target, and notification to the driver of the presence of the warning target is unnecessary at this time. Therefore, the safety control unit 26 ends the safety control step S22.

Meanwhile, when determined that the most proximal time Ts is not equal to or greater than the predetermined threshold Ts, the safety control unit 26 determines that notification to the driver of the presence of the warning target is necessary at this time. Therefore, the safety control unit 26 proceeds to step S74.

At step S74 (position and placement detection step), the position and placement detecting unit 28 detects the position and the placement of the warning target based on the recognition results of the image recognition at step S12. According to the present embodiment, as the position of the warning target, "front left," "front," and "front right" that are directions visible from the driver are used. As the placement of the warning target, "on the roadway," "on the sidewalk," and the like are used. As described above, in the image recognition in the safe driving method according to the present embodiment, the distribution ranges of the roadway, the sidewalk, and the like, and the ground position of the pedestrian are simultaneously recognized. Therefore, the location of the warning target, such as "on the roadway" or "on the sidewalk." can be detected.

At step S75 (attribute detection step), the attribute detecting unit 30 detects the attributes of the warning target by image recognition, based on the image acquired at step S11. According to the present embodiment, as the attributes of the warning target, types of clothing and baggage, age, sex, and the like are used. As such image recognition, for example, the image recognition disclosed in Y. Deng, and et al., Pedestrian attribute recognition at far distance, ACM MM 2014 can be used.

At step S76 (warning notice generation step), the safety control unit 26 generates a warning notice based on the position and the placement of the warning target detected at step S74, and the attributes of the warning target detected at step S75. According to the present embodiment, for example, a warning notice such as "be aware of 'young' 'male' in 'red clothes' 'on the side walk' on the 'front left'" is generated.

At step S77 (warning notice notification step), the safety control unit 26 controls the notifying unit 34 using the on-board output device 116 to notify the driver of the vehicle of the warning notice generated at step S76. As the notification method for the warning notice, screen display output, synthesized audio output, and the like can be performed by the notifying unit 34 using the on-board output device 116 such as an on-board display, an on-board speaker, and the like.

The vehicle safe driving apparatus 100 and the method thereof according to the present embodiment achieve the following effects.

In the vehicle safe driving apparatus 100 and the method thereof according to the present embodiment, the type, position, and shape of each recognition target in an image are recognized by image recognition based on the image of an area observed from the vehicle. In addition, based on the recognition results of the image recognition, the predicted path of the target to be subjected to safety determination is calculated. Based on the calculated predicted path, the predicted position of the target at the most proximal time at which the vehicle and the target are in closest proximity is calculated.

Furthermore, the safety determination regarding the target is performed based on the predicted position of the target, and the type, position, and shape of at least one recognition target other than the target recognized by the image recognition. Therefore, the safety determination regarding the target can be accurately performed.

In particular, according to the present embodiment, in the image recognition, the positions and shapes of the pedestrian and the roadway are simultaneously recognized. Therefore, calculation of the walking path of the pedestrian, detection of the roadway on which the vehicle is traveling, and detection of the distribution range of the roadway can be performed. The distance to the pedestrian from the roadway at the most proximal time can be calculated.

Here, even when the pedestrian is positioned relatively close to the advancing-direction center line of the vehicle, if the pedestrian is positioned relatively far from the roadway, the pedestrian can be considered safe. According to the present embodiment, the distance to the pedestrian from the roadway is calculated. The safety determination is performed based on the calculated distance. Therefore, the safety determination regarding the pedestrian can be accurately performed.

Furthermore, in the image recognition, the positions and shapes of the guardrails and the like are also simultaneously recognized. Therefore, whether or not the guardrail or the like that prevents the pedestrian from entering the roadway is present on the predicted walking path of the pedestrian can be detected.

Here, even when the distance to the pedestrian from the vehicle is relatively short and the pedestrian is positioned on the roadway at the most proximal time, if the guardrail or the like that prevents the pedestrian from entering the roadway is present on the predicted walking path of the pedestrian, the pedestrian is unlikely to enter the roadway and can be considered safe. According to the present embodiment, the safety determination is performed based on whether or not the guardrail or the like that prevents the pedestrian from entering the roadway is present on the predicted walking path of the pedestrian. Therefore, the safety determination regarding the pedestrian can be performed with further accuracy.

In the vehicle safe driving apparatus 100 and the method thereof according to the present embodiment, the placement of the target is detected based on the recognition results of the image recognition. The driver of the vehicle is notified of both the determination result of the safety determination regarding the target and the placement of the target. Therefore, the driver can be accurately warned of the target.

In particular, according to the present embodiment, the positions and shapes of the pedestrians, roadways, sidewalks, and the like are simultaneously recognized. Therefore, the ground position of the pedestrian can be detected. The location of the pedestrian, such as on the roadway or on the sidewalk, can be detected. Consequently, the driver can be notified of the location of the warning target, such as on the roadway or on the sidewalk. The driver can be accurately warned of the warning target.

The safe driving apparatus 100 and the method thereof are described in the embodiment and variation examples described above. However, a program that enables a computer to implement the various functions of the safe driving apparatus 100 according to the embodiment and variation examples, and a program that enables a computer to perform the various steps of the safe driving method according to the embodiment and variation examples are also included in the present disclosure.

What is claimed is:

1. A vehicle safety determination apparatus comprising:
   an image acquiring unit that acquires an image of an area observed from a vehicle;
   an image recognition recording unit that
      recognizes a type, position, and shape of each recognition target in an image, based on the image acquired by the image acquiring unit,
      records the type, position, and shape of each recognition target, and
      detects a target to be subjected to a safety determination among recognition targets;
   a predicted path calculator that calculates a predicted path of the target based on the recognition results of the image recognition for the target recorded in the image recognition recording unit;
   a traveling state detector that detects a traveling state of the vehicle;
   a distance and movement state detector that detects a distance from the vehicle and a movement state of the target;
   a most proximal time calculator that calculates a most proximal time at which the vehicle and the target are in closest proximity, based on the traveling state of the vehicle, and the distance from the vehicle and the movement state of the target; and
   a safety determiner that calculates a predicted position of the target at the most proximal time based on the predicted path, and performs the safety determination regarding the target based on the predicted position and on the type, position, and shape of at least one recognition target other than the target recognized by the image recognition recording unit.

2. The vehicle safety determination apparatus according to claim 1, wherein:
   the safety determiner performs the safety determination regarding the target based on a position and shape of a roadway on which the vehicle is traveling, and the predicted position.

3. The vehicle safety determination apparatus according to claim 2, wherein:
   the safety determiner increases a degree of safety of the target as a distance from the roadway to the predicted position increases.

4. The vehicle safety determination apparatus according to claim 2, wherein:
   the safety determiner performs the safety determination regarding the target based on whether or not an entry prevention object that prevents the target from entering the roadway is present on the predicted path.

5. A vehicle safe driving apparatus comprising:
   the vehicle safety determination apparatus according to claim 1;
   a location detector that detects placement of the target based on the recognition results of the image recognition for each recognition target by the image recognition recording unit; and
   a notifying unit that notifies a driver of the vehicle of the placement of the target and a determination result of the safety determination regarding the target determined by the safety determiner.

6. A vehicle safety determination method comprising:
   acquiring, using a processor of a vehicle safety determination apparatus mounted to a vehicle, an image of an area observed from a vehicle;
   recognizing, using the processor, a type, position, and shape of each recognition target in an image, based on the image acquired,
   recording the type, position, and shape of each recognition target, and detecting a target to be subjected to safety determination among the recognition targets;
   calculating, using the processor, a predicted path of the target based on the recognition results of the image recognition for the recorded target;
   detecting, using the processor, a traveling state of the vehicle;
   detecting, using the processor, a distance from the vehicle and a movement state of the target;
   calculating, using the processor, a most proximal time at which the vehicle and the target are in closest proximity, based on the traveling state of the vehicle, and the distance from the vehicle and the movement state of the target;
   calculating, using the processor, a predicted position of the target at the most proximal time based on the predicted path; and
   performing, using the processor, the safety determination regarding the target based on the predicted position and on the type, position, and shape of at least one recognition target other than the target.

7. A non-transitory computer-readable storage medium storing a vehicle safety determination program for enabling a computer executing the vehicle safety determination program to:
- acquire an image of an area observed from a vehicle;
- recognize a type, position, and shape of each recognition target in an image, based on the image acquired;
- record the type, position, and shape, and detect a target to be subjected to a safety determination among the recognition targets;
- calculate a predicted path of the target based on the recognition results of the image recognition for the recorded target;
- detect a traveling state of the vehicle;
- detect a distance from the vehicle and a movement state of the target;
- calculate a most proximal time at which the vehicle and the target are in closest proximity, based on the traveling state of the vehicle, and the distance from the vehicle and the movement state of the target;
- calculate a predicted position of the target at the most proximal time based on the predicted path; and
- perform the safety determination regarding the target based on the predicted position and on the type, position, and shape of at least one recognition target other than the target.

* * * * *